Feb. 6, 1962 C. A. PEEK, JR 3,019,600
TURBO-FAN ENGINE THRUST REVERSER
Filed Aug. 3, 1959
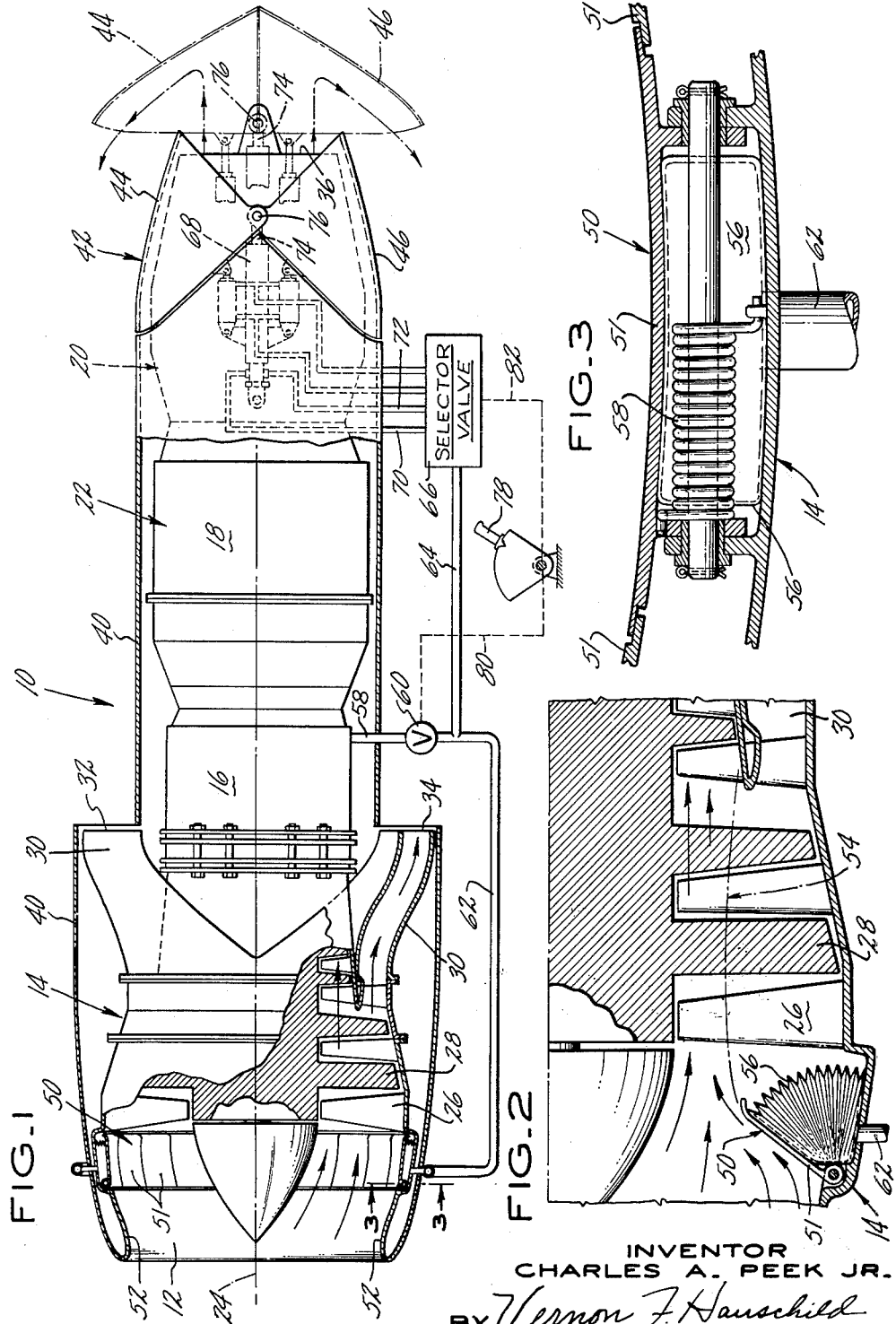
INVENTOR
CHARLES A. PEEK JR.
BY *Vernon F. Hauschild*
ATTORNEY United States Patent Office 3,019,600
Patented Feb. 6, 1962

3,019,600
TURBO-FAN ENGINE THRUST REVERSER
Charles A. Peek, Jr., South Glastonbury, Conn., assignor to United Aircraft Corporation, East Hartford, Conn., a corporation of Delaware
Filed Aug. 3, 1959, Ser. No. 831,378
1 Claim. (Cl. 60—35.54)

This invention relates to thrust reversing mechanism and more particularly to thrust reversing mechanism for use on a front fan type turbo-fan engine installed in a nacelle and having fan ducts discharging air forward of the aftermost part and along the nacelle.

In the ordinary turbo-jet engine, it is possible to reverse the engine thrust by merely reversing the direction of flow of the turbine exhaust gases which are being discharged to atmosphere to generate thrust. Thrust reversal in a front fan type turbo-fan engine with forward fan discharge is not this simple. A sizeable portion of the total thrust generated is attributable to the discharge of air to atmosphere through the fan section of the engine. Hence, thrust will continue to be generated by the fan portion of the engine when the turbine exhaust gases being discharged to atmosphere from the engine proper are being reversed in direction.

Accordingly, it is an object of this invention to provide a thrust reverser for a turbo-fan engine wherein the inlet air flow to the fan thrust producing section of the engine is blocked thus nullifying the fan thrust, while the turbine exhaust gases from the engine are reversed in direction.

It is a further object of this invention to teach a turbo-fan thrust reverser wherein the direction changing mechanism utilized to reverse the flow of the turbine discharge gases performs the additional function of reducing the effective discharge area as sensed by the turbine exhaust gases and hence, builds up a back pressure so that the pressure ratio across the turbine, and hence the turbine power output, is reduced by an amount equal to the reduction in power absorbed by the compressor when the fan section is blocked. This reduction in effective area as sensed by the turbine exhaust gases also increases the available turbine exhaust gas thrust over that available during forward thrust operation at the same turbine inlet temperature.

It is a further object of this invention to teach a thrust reverser mechanism wherein bellows are used as an actuating means for passage blockage apparatus and, further, wherein springs are used to assist said bellows in returning said blockage mechanism to its original position.

Other objects and advantages will be apparent from the following specification and claims, and from the accompanying drawings which illustrate an embodiment of the invention.

FIG. 1 is a showing of a turbo-fan engine, partly broken away and in section, showing my thrust reverser. Actuating apparatus is shown external of the nacelle for purposes of clearer illustration.

FIG. 2 is an enlarged, fragmentary view of the fan section of my engine showing the fan flockage flaps in their operable position.

FIG. 3 is an enlarged showing thru line 3—3 of FIG. 1.

Referring to FIG. 1, we see turbo-fan engine 10 which includes air inlet section 12, fan or bypass section 14, compressor section 16, burner section 18 and turbine section 20. Basically, turbo-fan engine 10 includes a turbo-jet engine 22 with fan section 14 encompassing a portion of engine 22, preferably the forward portion as shown in FIG. 1 but it could as well encompass the rear portion (see page 766 of the June 6, 1958 issue of Flight) or the entire engine. With respect to the operation of turbo-fan engine 10, which is concentric about axis 24 and of generally circular cross section, air enters air inlet section 12, then passes through the stationary vanes 26 and rotating blades 28 of bypass section 14 and then passes either through bifurcated duct 30 to atmosphere through outlets 32 and 34, or through turbo-jet engine 22. Turbo-jet engine 22 may be of the conventional type taught in U.S. Patents Nos. 2,711,631 or 2,747,367 wherein air is compressed in compressor section 16, heated in burner section 18, has energy extracted therefrom in turbine section 20 to drive the air compressing rotors of fan section 14 and compressor section 16 and is thence discharged to atmosphere to generate thrust through engine exhaust outlet 36. The aforementioned engine constructions may be converted to turbo-fan engines by attaching bypass section 14 to the front of the compressor thereof. Accordingly, turbo-fan engine 10 generates thrust by discharging air which has been compressed by bypass section 14 and then discharged directly to atmosphere thru bifurcated duct 30 and also by discharging heated exhaust gases of combustion of turbo-jet engine 22 to atmosphere through engine exhaust outlet 36. Bypass section 14 includes at least one rotor stage such as 28, and preferably two, as shown, and further includes stator units such as 26 therebetween.

Engine nacelle 40 defines a portion of inlet section 12 and encompasses both bypass section 14 and engine section 22 of turbo-fan engine 10. For a more complete description of turbo-fan engine 10, reference is hereby made to U.S. application Serial No. 720,961, filed March 12, 1958, entitled Ducted Fan Engine by Thomas L. Briggs, Jr. and being commonly assigned herewith.

The thrust reverser mechanism taught herein basically includes pivotal clamshell means 42 which are attached to engine 10 so as to be pivotal between a retracted or stowed position shown in full in FIG. 1 wherein the pivotal shells 44 and 46 do not interfere with the discharge of exhaust gases through outlet 36 and form a smooth continuation of nacelle 40 and an operable position, shown in dotted lines in FIG. 1, wherein shells 44 and 46 abut to block the exhaust gases being discharged to atmosphere through outlet 36 and cause them to turn through a substantial arc, preferably about 135°, but minimally in excess of 90°, so that the exhaust gases are now discharged to atmosphere in a direction substantially in reverse to the normal discharge direction. If the device is to be used as a thrust spoiler only, direction reversal of less than 90° is acceptable. The other major component of the turbo-fan thrust reverser taught herein is contoured pivotal flap unit 50 which includes a plurality of circumferentially positioned and overlapping flaps 51 pivotally attached at their forward ends to the inner wall 52 of air inlet section 12. Faps 51 are radially pivotable between a retracted or stowed position shown in solid lines in FIG. 1 wherein they present no restriction to air flow through fan section 12 and an operable position shown in FIG. 2 wherein they direct the air entering inlet 12 inwardly so that it follows the arc shown in phantom at 54 in FIG. 1 to block air entry into bifurcated duct 30 and hence, eliminate the effect of the outer portion of the fan section 14. Bypass section 14 has stationary vanes 26 and fan blades 28 which are designed to cooperate to produce axial gas flow into compressor 16 and bypass section 30. While, with flaps 51 in their blocking (FIG. 2) position, a certain amount of air will pass through bypass section 30 due to the centrifugal action of fan blades 28, tests show that at least 60 percent blockage of flow through by-pass section 30 can be obtained by the actuation of flaps 51. This blockage action can be increased by the use of well-known mid-blade shrouding used with fan blades 28. Such mid-blade shrouding is common with blades such as 28 with large radial dimension.

As best shown in FIG. 2, bellows 56 may be used to pivot flaps 51 to their operable position and springs 58 may be used to augment bellows 56 in returning flaps 51 to their stowed position.

Any fluid power source or other actuating means may be used to actuate flap unit 50 and clamshell unit 42. It is suggested that compressed air, preferably from the downstream end of compressor 16 to be piped through conduit 58, through pilot actuated valve 60 and then through conduit 62 to expand and hence, actuate bellows 56. This compressed air may also be piped through conduit 64 and pilot actuated selector valve 66 selectively to opposite sides of cylinder-piston actuating means 68 through line 70 or 72, thereby actuating rod 74 and causing clamshells 44 and 46 to pivot in unison about pivot point 76 between their operable and stowed position.

For a more complete description of clamshell unit 42, reference may be had to U.S. application Serial Nos. 433,715 entitled Reverse Thrust Device by Robert E. Meyer, U.S. application Serial Number 623,693 entitled Thrust Reverser by Voymas et al., or U.S. Patent No. 2,780,057. It will be obvious to those skilled in the art that thrust reversers of the type taught in U.S. Patents Serial Nos. 2,803,944, 2,838,909, 2,841,956 and 2,874,538, for example, could be substituted for clamshell unit 42.

Since pilot lever 78 will be attached through lines 80 and 82 to simultaneously actuate valve 60 and selector valve 66, blockage means 50 and flow reversal means 42 will be actuated to their operable, solid line FIG. 1, position, simultaneously and retracted to their stowed, FIG. 1, position, simultaneously and retracted to their stowed, FIG. 2 and FIG. 1 phantom lines, respectively, simultaneously.

Clamshell unit 42 will preferably be selected to be so shaped and positioned with respect to outlet 36 that when in its operable position, it will decrease the effective area of the turbine exhaust gas outlet and hence, build up a back pressure to reduce the pressure ratio across turbine 20 and thereby reduce the power extracted from the exhaust gases by turbine 20 an amount equal to the reduction in power absorption required by bypass section 14 and compressor section 16 when blockage means 50 is in its operable position so that turbine section 20 and compressor 16 and bypass 14 are matched with respect to turbine power output and compressor and fan power absorption during the thrust reversal condition. Due to the reduction in the power absorption required of turbine 20 during this thrust reversal operation, there will be an increase in the available exhaust gas thrust output over that available during forward thrust operation at the same turbine inlet temperature. Preferably, the effective area of the turbine exhaust gas outlet, that is the area defined between engine outlet 36 and flaps 44 and 46, is reduced from the area of outlet 36 during reverse thrust operation by substantially the same amount that the actuation of flaps 50 reduces the area of inlet 12.

In installations where the fan is located at the engine rear or extends the entire engine length, since both the engine gases and fan air will be discharged in substantially the same axial plane, thrust reverser 42 can be used to reverse the flow of both.

It is to be understood that the invention is not limited to the specific embodiment herein illustrated and described, but may be used in other ways without departure from its spirit as defined in the following claims:

I claim:

A turbo-fan jet engine having an axis and an air inlet section open to ram air at its forward end and containing an engine driven fan designed to promote axial flow and inhibit radial flow and both a turbo-jet engine with an outlet and an engine encompassing short bypass section with an outlet, both said turbo-jet engine and bypass section communicating with and receiving fan discharge air from said inlet for eventual discharge to atmosphere through said outlets to generate forward thrust, a thrust reverser comprising pivotal flap means in said inlet forward of said fan to thereby block flow through the bypass section, and clam-shell means pivotally attached to said engine outlet to reverse the flow being discharged to atmosphere therethrough from the engine, and means to simultaneously actuate said flap means and said clamshell means between a retracted position wherein they present no resistance to flow and an operable position wherein flow through said bypass section is blocked and the effective fan inlet area is reduced and flow discharged from said engine outlet is reversed, said clam-shell means so shaped and positioned with respect to said engine outlet that when said clam-shell means is in its operable position, the effective outlet area of said turbo-jet engine is reduced so that the output of said engine is reduced an amount substantially equal to the reduction in power absorbed by said fan section when said pivotal flap means blocks flow through said bypass section.

References Cited in the file of this patent

UNITED STATES PATENTS

| | | |
|---|---|---|
| 2,696,079 | Kappus | Dec. 7, 1954 |
| 2,702,985 | Howell | Mar. 1, 1955 |
| 2,737,019 | Billman | Mar. 6, 1956 |
| 2,763,426 | Erwin | Sept. 18, 1956 |
| 2,798,360 | Hazen et al. | July 9, 1957 |
| 2,873,576 | Lombard | Feb. 17, 1959 |
| 2,936,578 | Chamberlain | May 17, 1960 |

FOREIGN PATENTS

| | | |
|---|---|---|
| 547,646 | Belgium | Sept. 1, 1956 |